(12) United States Patent
Kondal et al.

(10) Patent No.: US 10,621,622 B1
(45) Date of Patent: Apr. 14, 2020

(54) ADAPTIVE SEQUENCING OF NOTIFICATIONS IN A CLIENT SERVER ARCHITECTURE

(71) Applicant: Amazon Technologies, Inc., Seattle, WA (US)

(72) Inventors: Tegdeep Kondal, Seattle, WA (US); Nisarg Shah, Redmond, WA (US); Alexander Slutsker, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1051 days.

(21) Appl. No.: 14/866,754

(22) Filed: Sep. 25, 2015

(51) Int. Cl.
*G06Q 30/02* (2012.01)
(52) U.S. Cl.
CPC .................. *G06Q 30/0269* (2013.01)
(58) Field of Classification Search
CPC .................................................. G06Q 30/0269
USPC ....................................................... 705/14.66
See application file for complete search history.

(56) References Cited

FOREIGN PATENT DOCUMENTS

WO    WO-2006012318 A2  *  2/2006 ........... G06F 16/134

OTHER PUBLICATIONS

Antonio Carzaniga, Architectures for an Event Notification Service Scalable toWide-area Networks, 1998 (Year: 1998).*

* cited by examiner

*Primary Examiner* — Tarek Elchanti
(74) *Attorney, Agent, or Firm* — Kilpatrick Townsend & Stockton LLP

(57) ABSTRACT

Techniques for providing notifications may be described. In particular, responses to past notifications transmitted from a computer system to a user device associated with a user account may be accessed. A notification profile for the user account may be generated based on the responses. The notification profile may include sequence of time slots to transmit notifications within a time period. A notification topic may also be determined based on past interactions of the user device with the computer system. Notifications corresponding to that notification topic may be scheduled for transmission to the user device based on the notification profile. A response to a transmitted notification may be analyzed to determine whether to change the notification topic. If so, remaining notifications may be updated based on the change before transmittal.

20 Claims, 9 Drawing Sheets

ADAPTIVE SEQUENCING OF NOTIFICATIONS IN A CLIENT SERVER ARCHITECTURE

BACKGROUND

Client-server architectures provide different functionalities. Generally, a server may host a suite of applications that a client may access remotely over a network. In certain situations, the server may transmit notifications related to some of the applications to the client. The notifications and the transmission thereof may impact not only the client's usage of the applications, but also usage of computing resources of the server, the client, and/or the network.

To illustrate, a computer system may represent a collection of servers or a server farm to facilitate an electronic marketplace. A user device may include a personal computing device, such as a smartphone, that may access the computer system over a network. The user device may run an application to interact with the electronic marketplace, such as to browse, purchase, and/or return items. To enhance the interactions, the computer system may transmit notifications to the user device for presentation via the application. The notifications may relate to the items, the electronic marketplace, and/or the application itself. The number, content, and timings of the notifications may affect the user experience, network bandwidth, processing of the computer system, and/or processing of the user device.

BRIEF DESCRIPTION OF THE DRAWINGS

Various embodiments in accordance with the present disclosure will be described with reference to the drawings, in which.

DETAILED DESCRIPTION

Figure 1:
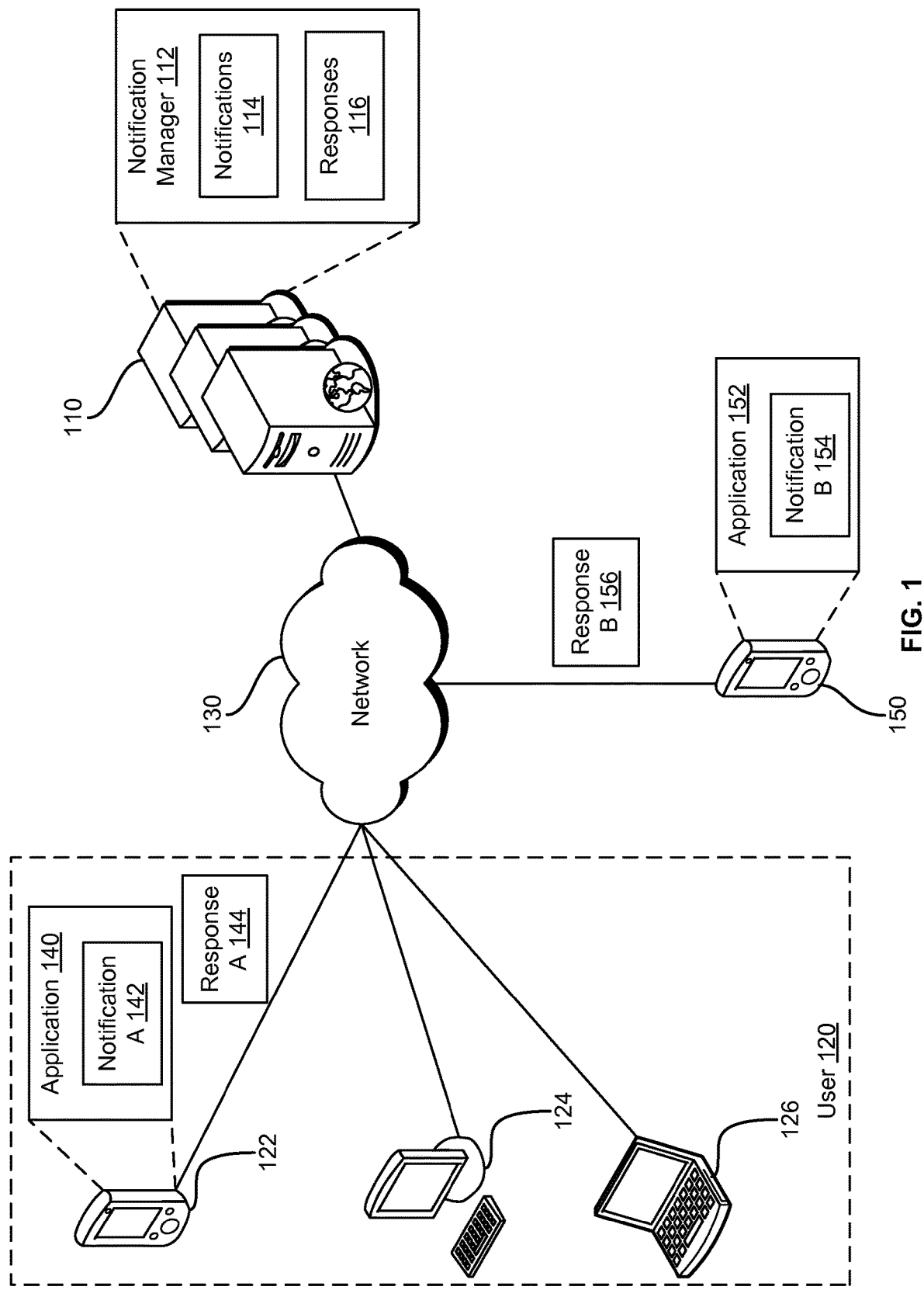
FIG. 1 illustrates an example client-server architecture where notifications may be transmitted, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to managing notifications in a client-server (or similar) architecture. In particular, a computer system may represent a server hosting various applications. A user device may represent a client accessing the applications over a network. Notifications related to the applications may be exchanged between the computer system and the user device. To enhance the user experience, reduce usage of the computing resources of the computer system and user device, and/or reduce usage of the network bandwidth, a notification manager of the computer system may manage the notifications. For example, the notification manager may be configured to determine the number of notifications for transmission to the user device within a time period (e.g., on a daily basis) and the time for transmitting each of these notifications. To do so, the notification manager may analyze past notifications transmitted to the user device and responses to the notifications received from the user device. Based on the analysis, the notification manager may generate a notification profile that may indicate a sequence of time slots within the time period, where each time slot may correspond to a time frame for transmitting a notification. The notification manager may also analyze past interactions of the user device with the computer system to determine potential topics of interest. Content of the notifications may be selected to reflect these potential topics. The notification manager may schedule the notifications having that content for transmission to the user device according to the notification profile. Upon transmission of a notification, the response thereto may be monitored in real-time. Real-time may represent the capability of changing, based on the response, a next scheduled notification prior to the scheduled time of such a notification and without altering the scheduled time. If the response indicates a deviation from an expected response (e.g., the notification was dismissed when the notification was expected to be reviewed), the content of the next scheduled notification may be updated in real-time and subsequently transmitted according to the notification profile. As such, the notification manager may refine or optimize the number, content, and timings of the notifications. This may translate into an enhanced user experience (e.g., from receiving a proper number at proper times with proper content of notifications according to the tolerance of the user for notifications) and/or reduced computing resource usage (e.g., just the sufficient number of notifications may be generated, transmitted, and accessed). In addition, the notification manager may associate the notification profile with other user devices such that these user devices would receive notifications based on the notification profile. Doing so may reduce the processing of the computer system to schedule notifications for the different user devices.

To illustrate, consider an example of an electronic marketplace. Notifications that advertise items and/or statuses of purchased items available from the electronic marketplace may be transmitted from a computer system facilitating functionalities of the electronic marketplace to a user device of a consumer. Based on historical responses to such notifications, a notification manager may generate a notification profile indicating that five (or some other number) notifications may be transmitted to the user device within a day. The notification profile may also indicate a time frame within the day to send each of the five notifications. Based on the notification profile, the consumer may be expected to view the five notifications within the day. Next, the notification manager may analyze past interactions of the user device with the computer system (e.g., what items were browsed, what keywords were searched, what transactions were conducted) to determine and rank particular notification topics that may be of interest to the consumer (e.g., the consumer may be interested in televisions, cameras, and movies in a descending order of interest). Five notifications having content corresponding to the highest ranked notification topic (e.g., televisions) may be scheduled for transmission to the user within the day. The first notification may be sent within the corresponding time frame. The response may indicate that the consumer viewed that notification. Accordingly, the second notification may be sent within the next corresponding time frame. However, the response this time may indicate that the consumer dismissed the second notification, contrary to what may have been expected. To address this deviation, the topic of the remaining notifications may be changed to the next ranked notification topic (e.g., cameras). As such, the third notification may include content related to the other notification topic. The third notification may then be transmitted within the corresponding third time frame. The transmission and monitoring process may be repeated until transmission of all notifications. Over time, the responses may be further analyzed to update the notification profile.

In the interest of clarity of explanation, embodiments may be described herein in connection with notifications related to an electronic marketplace. However, the embodiments are not limited as such. Instead, the embodiments may similarly apply to any other notifications within a computing environment, such as one including a client-server architecture or any environment where two or more computing devices may exchange notifications. For example, the embodiments may similarly apply to providing notifications as part of an advertisement service, calendar service, a service for updating an application (e.g., alerting user of software updates or application versions).

Turning to FIG. 1, the figure illustrates an example computing environment where notifications may be exchanged. In particular, a computer system 110 may be in communication with user devices over a network 130. The user devices may be operated by different users. For example, a user 120 may operate user devices 122-126, while another user may operate another user device 150. The computer system 110 may transmit notifications 114 to the user devices and may receive back responses 116 to the notifications 114.

In an illustrative example, the computer system 110 may be associated with an electronic marketplace. The computer system 110 may include a number of computing resources, such as server or a server farm, configured to facilitate functionalities of the electronic marketplace. For example, the computer system 110 may host an electronic platform. The electronic platform may include a front end system, such as a web site of the electronic marketplace, to offer items and different delivery methods. A user operating a user device may interact with the front end system to purchase available items and select delivery methods. The electronic platform may also include a back end system to process and manage deliveries of item orders and item returns. An example configuration of the computer system 110 is further illustrated in FIG. 9.

A user device may include any suitable computing device capable of communicating with the computer system 110 over the network 130. For example, the user device may include a number of general purpose personal computers, such as desktop or laptop computers running a standard operating system, as well as cellular, wireless, and handheld devices running mobile software and capable of supporting a number of networking and messaging protocols.

The network 130 may include any one or a combination of many different types of networks. For example, the network 130 may include any of wireless networks, cable networks, cellular networks, radio networks, the Internet, and other private and/or public networks.

As such, a user may operate a user device and access the computer system 110 over the network 130 to interact with the electronic marketplace. The interaction may include browsing, searching, purchasing, returning an item, and/or other electronic marketplace-related functionalities. As part of the user experience, notifications may be transmitted to the user device to notify the user about items, discounts, deals, deliveries, returns, purchases, and/or any item or electronic marketplace-related information. In turn, the user may operate the user device to respond to these notifications. For example, the user may view or dismiss a notification.

As illustrated in FIG. 1, the user 120 may operate any of the user devices 122-126 to interact with the electronic marketplace. For example, the user device 122 may host an application 140 configured to access the electronic marketplace. The application 140 may include an application software, such as a web browser, a mobile application (e.g., a "mobile app" available from an "application store"), or other applications. The application 140 may provide or integrate with a user interface to present information from the electronic marketplace. For example, upon receiving a notification 142 from the computer system 110, the application may activate an audible and/or visual alert of the user device to notify the user 120 of the notification 142. The application 140 may also facilitate a user action (e.g., a swipe, a click, etc.) to respond to the notification 142. For example, if the user action is to view the notification 142, the application 140 may retrieve content of the notification 142 from the computer system and present the retrieved content. If the user action is to dismiss the notification 142, the content may not be retrieved and/or may not be presented. Instead, the application 140 may clear the audible and/or visual alert. In both cases, a response 144 corresponding to the notification 142 may be transmitted to the computer system 110.

Different techniques may be used to provide the response 144 depending on the configuration of the application 140. In one example technique, the notification 142 may be assumed as being dismissed unless its content is requested from the server 110. The request for the content and/or the lack thereof may represent the response 144. In another example technique, the application 140 and/or an operating system of the user device 122 may generate the response according to the user action and may transmit the response 144 to the computer system 110.

In addition to the user device 122, the user 120 may similarly operate the other user devices 124 and 126 to interact with the computer system 110. For example, these user devices, 124 and 126, may include similar applications and may facilitate receipt of notifications, viewing of some of the received notifications, and dismissals of the remaining notifications. Further, another user may also similarly operate the user device 150. As illustrated in FIG. 1, the other user device 150 may host an application 152 for receiving another notification 154 and providing another response 156. The application 152 may represent another instance of the application 140. Although FIG. 1 illustrates four user devices associated with two users, a much larger number of user devices (e.g., in the thousands and even millions) may interact with the computer system 110.

Generally, the computer system 110 may host a notification manager 112 for providing notifications 114 to the user devices and receiving responses 116 to the notifications 114 from the user devices. The notification manager 112 may be configured to analyze the notifications 114 and responses over time to manage what, when, and/or how many notifications should be transmitted to a user device. A measure of how successful the management is may be based on the type of responses. In particular, the more views and the less dismissals, the better the management may be.

To analyze and manage notifications, a transmitted notification (e.g., the notification 142) may include metadata. The metadata may identify the notification, the content of the notification, the time the notification may have been transmitted, and/or the recipient user device. A response to the transmitted notification (e.g. the response 144) may also include metadata in some examples. This metadata may identify the notification, the responding user device, and/or the response type.

As such, the notification manager 112 may track over time the number, type, and timings of transmitted notifications and received responses. This tracking may be performed by user device, group of user devices, user, and/or group of users. By doing so, the notification manager 112 may analyze the notifications and responses to generate notification profiles usable to manage the notifications for one or more of user devices and/or users. Example notification profiles are further illustrated in FIG. 3. An example of the analysis is illustrated in FIG. 2 and FIGS. 5-8.

Briefly, the analysis may be performed across different dimensions. At one dimension, the analysis may consider the tolerance of a user (or a group of users) to receive notifications. The tolerance may include the number and timings of these notifications and may be measured based on the rate of notification dismissals (or conversely the notification views). At another dimension, the analysis may consider the propensity of a user (or a group of users) for receiving particular notification topics. The propensity may be measured based on past interactions with the electronic marketplace (e.g., what items may have been previously searched). This dimension may facilitate the customization of the content of the notifications. At yet another dimension, the analysis may consider the real-time response of a user to a notification corresponding to a particular notification topic. The real-time response may be measured based on a deviation from an expected response. For example, if the user is expected to view, but ends up actually dismissing a notification, this real-time response may indicate that the content of the notification may not have been of interest to the user. As such, this dimension may allow real-time changes to the notification content (or notification topic).

By considering the above three analysis dimensions, the notification manager 112 may improve the management of the notifications such that transmitted notifications may be more likely viewed than dismissed. This may translate into an enhancement to the user experience because users may more likely receive notifications of interest. Further, instead of transmitting a preset number of notifications at preset times to different user devices, the notification manager 112 may adaptively set the proper number and the timings of notifications. This may translate into a reduction of usage of computing resources of the computer system 110, the network 130, and the user devices because the number and timing of the generated, transmitted, and received notifications may have been adapted to the needs of the users or capabilities of the user devices. As the number of user devices increases (e.g., in the thousands or even millions), such computing resource savings may become significant.

Figure 2:
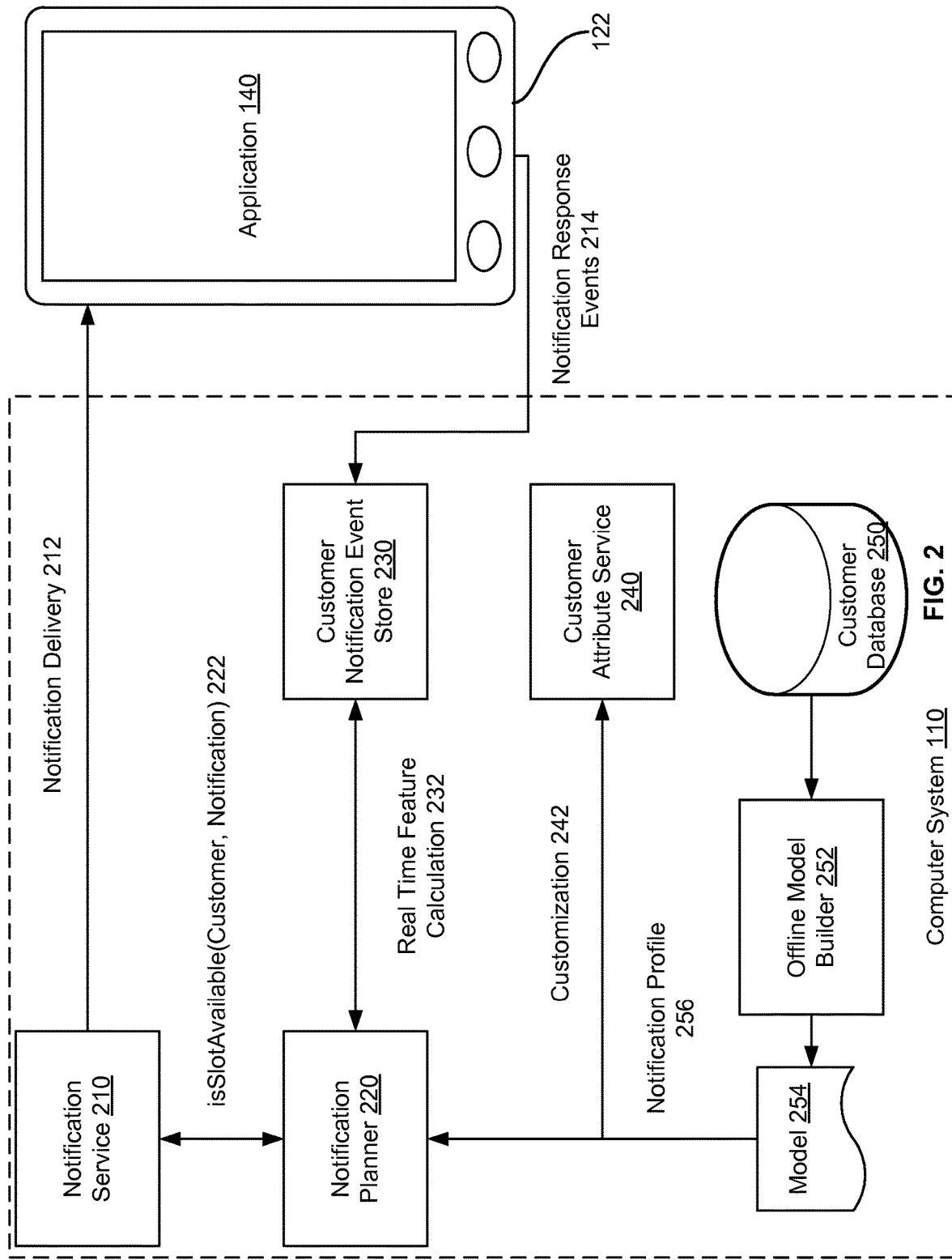
FIG. 2 illustrates an example computing architecture for generating notifications and monitoring responses thereto, according to a particular embodiment.

Turning to FIG. 2, the figure illustrates example components for implementing the notification manager 112 of FIG. 1. The example components may include a notification service 210, a notification planner 220, a customer notification event store 230, a customer attribute service 240, a customer database 250, an offline model builder 252, and a model 254. These components may be implemented in hardware and/or as a software module within the computer system 110. Each of these components is further described herein next.

The notification service 210 may be configured for notification delivery 212. For example, the notification service 210 may transmit notifications to the user device 122 for presentation by the application 140. In comparison, the notification planner 220 may plan for notification deliveries. For example, the notification planner 220 may schedule notifications to be transmitted by the notification service 210 to the user device 122, where the scheduling may be associated with a notification profile of the user 120 of the user device 122 or with the user device 122 itself. Scheduling may include selecting what notifications to transmit and when to transmit the selected notifications. In an example, the notification planner 220 may trigger the notification service 210 to transmit a particular notification to a particular user device based on a message. FIG. 2 illustrates an example message of "isSlotAvailable(Customer, Notification) 222" in which the notification and the customer (e.g., customer identifier or user device identifier of the customer) may be identified for the notification service 210.

The customer notification event store 230 may represent a data store configured to store in real-time events associated with responses to notifications. The responses may have been received from user devices. An event may represent a type of response to a notification, such as whether the notification may have been viewed or dismissed. For example, the customer notification event store 230 may receive notification response events 214 from the user device 122. Accordingly, the customer notification event store 230 may store indications whether notifications transmitted to the user device 122 may have been viewed or dismissed, identifiers of these notifications, and/or the timings of any viewings or dismissals.

The notification planner 220 may access the customer notification event store 230 to consider the real-time propensity of a customer for receiving a notification topic (illustrated in FIG. 2 as a "real-time feature calculation 232"). For example, the notification planner 220 may schedule a next notification for transmission to the user device 122. The notification planner 220 may determine the topic (or content) of the next notification based on the response to the last transmitted notification to the user device 122. If the corresponding stored event indicates that the user viewed the last notification topic, the notification planner 220 may use that same topic for the next notification. Otherwise, the notification planner 220 may change the topic of the next notification. As such, the real-time feature calculation 232 may enable customization of the content of a notification in real-time based on the latest information about the user's propensity for receiving a particular notification topic.

The customer attribute service 240 may be configured as a computing service to determine notification topics that may be of potential interest to different customers. Such a service may allow the customization 242 of notification for the different customers. For example, customer attribute service 240 may access a user account corresponding to the user 120 of the user device 122 to analyze the attributes of the user 120, such as gender, age, occupation, interests, type of the user account (e.g., a type of a membership subscription at the electronic marketplace, the time when the membership subscription may have been activated), subscriptions to particular notification topics, a user segment that the user account may belong to (e.g., a user segment segmenting a plurality of user accounts based on a common attribute related to interactions with the electronic marketplace, such as how recent and/or frequent the user device 122 may have accessed the electronic marketplace, and/or monetary spending at the electronic marketplace), etc. The customer attribute service 240 may access from the user account (or from a data store based on the user account) a history of interactions of the user 120 with the electronic marketplace. This history may include various attributes related to the interactions such as what items may have been browsed, what information may have been searched, what items may have been added to a virtual shopping cart, what items may have been removed from the virtual shopping cart, price ranges of items searched, and/or other interaction-related attributes. The customer attribute service 240 may implement various analysis techniques to identify the notification topics of interest. For example, customer attribute service 240 may apply machine learning, pattern recognition, regression models, and/or other analysis techniques to the attributes and history associated with the user 120. The analysis for the user 120 may also be expanded to other similar users (e.g., users belonging to the same user segment).

The customer database 250 may represent a data base storing information about customers of the electronic marketplace. For example, the customer database 250 may store any of the above information described in connection with the customer notification event store 230 and the customer attribute service 240. In addition, the customer database 250 may store the number of user devices associated with a user account, identifiers of the user devices, an amount of usage time with usage of an application (e.g., the time spent using the application 140 by the user 120 in the last hour, twenty-four hours, or other time intervals, and/or average usage time over a time period), a number of notification dismissals per user account or user device, a number of notification views per user account or user device, a total number of transmitted notification per user account or user device, type of the notifications (e.g., what content or notification topic), and/or time intervals between the transmitted notifications.

The offline model builder 252 may be configured to access the customer database 250, analyze some or all of the stored information, and generate a model 254. The model 254 may represent the tolerance of a user for notifications (e.g., number and timings of the notifications). In an example, the model 254 may include a notification profile 256 per user (or user account), user device, group of user (or group of user accounts), and/or group of user devices. Examples of the notification profile 256 are further illustrated in FIG. 3. Generally, the offline model builder 252 may generate and provide the model 254 to the notification planner 220. This may be performed in the background on a relatively infrequent basis. For example, the model 254 may be generated once and may be updated over various time periods (e.g., on a monthly basis).

In turn, the notification planner 220 may use the model to plan for the notifications. For example, the notification planner 220 may schedule a certain number of notifications to be transmitted within certain time intervals based on the notification profile 256.

As such, the notification planner 220 may have access to three dimensions to plan for notifications and may operate in conjunction with the notification service 210 to transmit the notifications according to the plan. In particular, the notification planner 220 may use the notification profile 256 to set the number of notifications and time intervals for transmitting the notifications to a user device. This may enable adapting the number and timings of the notifications to the tolerance of a user for the notifications. The notification planner 220 may also use the customization 242 to customize the content of the notifications based on the propensity of the user for receiving particular notification topics. The notification planner 220 may also use the real-time feature calculation 232 to update the content (or the notification topic) of notifications yet to be transmitted based on real-time monitoring of the user's response to notifications.

Figure 3:
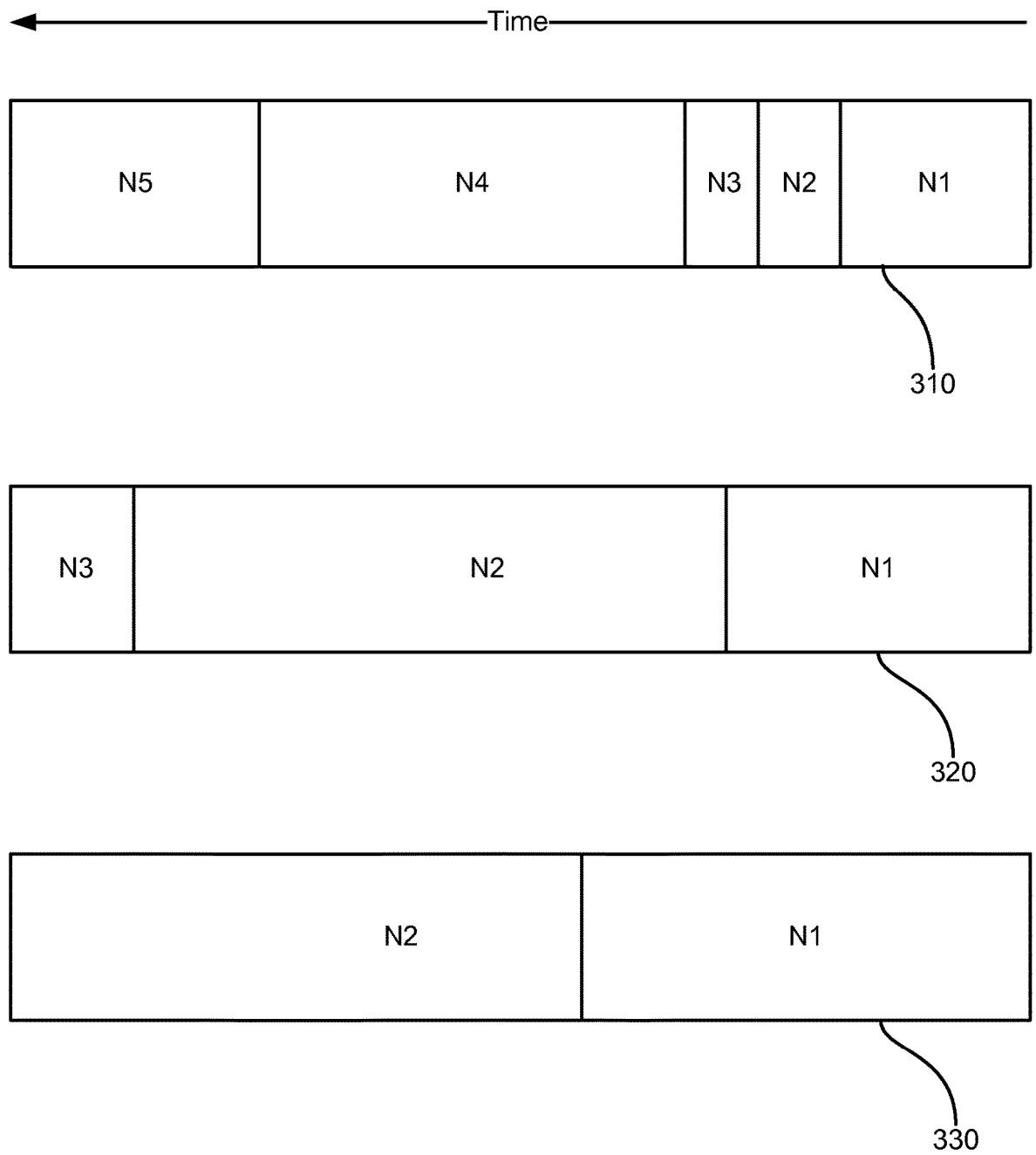
FIG. 3 illustrates an example notification profile, according to particular embodiments.

A notification profile may indicate the number and timings of notifications to be transmitted to one or more user devices associated with a user (e.g., with a user account at the electronic marketplace or the computer system 110). This indication may reflect the tolerance of the user for the notifications. FIG. 3 illustrates three notification profiles corresponding to users having different tolerances.

In an example, a notification profile may include a sequence of time slots to transmit notifications within a time period. Each time slot may correspond to a notification and may represent a time frame within which the corresponding notification may be transmitted. The sequence itself may represent an order by which the various notifications may be transmitted.

As illustrated, a first notification profile 310 may correspond to a first user (or a first user account, a first user device, or a first user segment). Within a time period (e.g., a day), the notification profile 310 may indicate that five total notifications (illustrated as "N1" through "N5") may be transmitted. For each of the notifications, the first notification profile 310 may specify the time slot for transmitting the notification (e.g., illustrated in FIG. 3 as a width of a notification, where width represents time). For example, "N1" may be transmitted at any time between 8:00 AM and 8:59 AM, but not before or after that time slot, and whereas "N2" may be transmitted only between 9:00 AM and 9:29 AM. The sequence of "N1," "N2," and so on and so forth may indicate that "N1" should be sent first, followed by "N2" and so on and so forth. The duration of the time slots may vary and may indicate a varying tolerance of the first user across the time period. For example, shorter and more frequent notifications (e.g., "N1" through "N3") early in the day may indicate that the first user may tolerate a larger number of notifications during that part of the day.

The first notification profile 310 may also indicate whether this transmission may be collectively performed in association with a user account of the first user. In this case, the five total notifications may be sent across all of the user devices of the first user. As such, if the first user operates two devices, a total of five (rather than ten) notifications may be sent to both user devices. Alternatively, the first notification profile 310 may indicate whether the transmission may be individual to each of the user devices. As such, if the first user operates two user devices, ten total notifications may be transmitted (e.g., five notifications may be transmitted to each user device).

In comparison, a second notification profile 320 may correspond to a second user (or a second user account, a second user device, or a second user segment). As illustrated, within that same time period (e.g., the one day), the second user may tolerate receiving three notifications. The tolerated timings of these notifications may also vary within the time period. Similarly, a third notification profile 330 may correspond to a third user (or a third user account, a third user device, or a third user segment). As illustrated, the third user may tolerate two notifications within the time period.

As such, a notification profile may be used to plan how many and when notifications should be transmitted to a user device. The actual content of the notifications may be customized based on the targeted user's propensity for receiving particular notification topics. By doing so, the transmitted notifications may be adapted to the particular tolerance and propensity of the user. As such, a response behavior of the user to the notifications may be expected. For example, the response behavior may be expected to include a dismissal rate of notifications below a threshold (e.g., ten percent). If a different behavior is observed over time (e.g., frequently or repeatedly), the notification profile may be updated.

Figure 4:
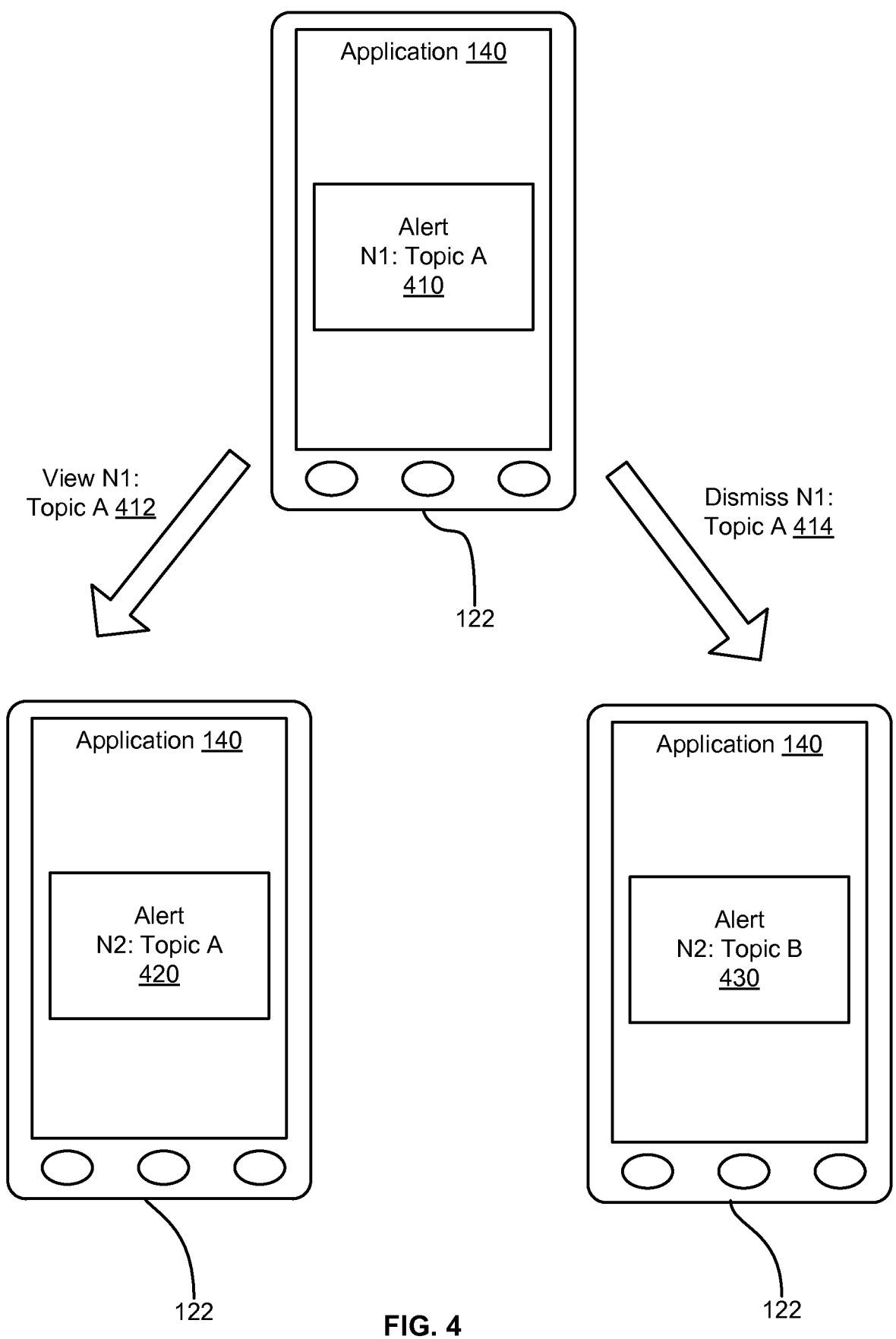
FIG. 4 illustrates an example transmission of notifications, according to a particular embodiment.

In addition, to avoid exceeding such a rate, the responses of the user may be monitored and analyzed in real-time to change the content or notification topic. FIG. 4 illustrates an example of such monitoring and change. In particular, a notification about a particular topic (illustrated as topic "A") may be available (e.g., transmitted or scheduled for transmission) to the user device 122. As such, the application 140 may activate an alert 410 at the user device 122. The alert 410 may include a short description or a portion of the content of the notification and may be displayed at a particular location at a user interface of the user device 122. The alert 410 may also include a visual (e.g., a flashing light) or audible (a beep) alerts at the user device 122. In turn, the user 120 may swipe the alerts 410 in one direction at the user interface to view the notification. This swipe would result in a view response 412 transmitted to the computer system 110. Alternatively, the user 120 may swipe the alert 410 in another direction at the user interface to dismiss the notification. This swipe would result in a dismissal response 414 transmitted to the computer system 110.

Depending on the response event, a second notification may be available to the user device 122. As illustrated, if the event type was the view response 412, the second notification may relate to the same topic as the one of the first notification (e.g., topic "A"). This may reflect the likelihood that this topic may be of interest to the user because the user viewed the first notification. As such, that same topic may be used for the second notification. Thus, the application 140 may activate a second alert 420 related to this notification topic. Alternatively, if the event type was the dismissal response 414, the second notification may relate to a different topic. This may reflect the likelihood that the first topic may not have been of relevant interest to the user because the user dismissed the first notification. As such, a second notification topic (illustrated as topic "B") may be selected based on the user's propensity for receiving notification topics and used for the second notification. Thus, the application 140 may activate another alert 430 related to this second notification topic (e.g., topic "B") to alert the user of the second notification.

Although FIG. 4 illustrates two notifications transmitted to a same user device, the real-time monitoring and update process may be similarly applied to a larger number of notifications and/or across multiple user devices of the user. For example, if five notifications should be transmitted to the user device 122, this process may be repeated up to the fifth notification. Similarly, if after the second notification, another user device of the user 120 becomes active (e.g., the user 120 turns to the user device 124 to access the electronic marketplace), the third notification may be transmitted to and customized based on this other user device.

Figure 5:
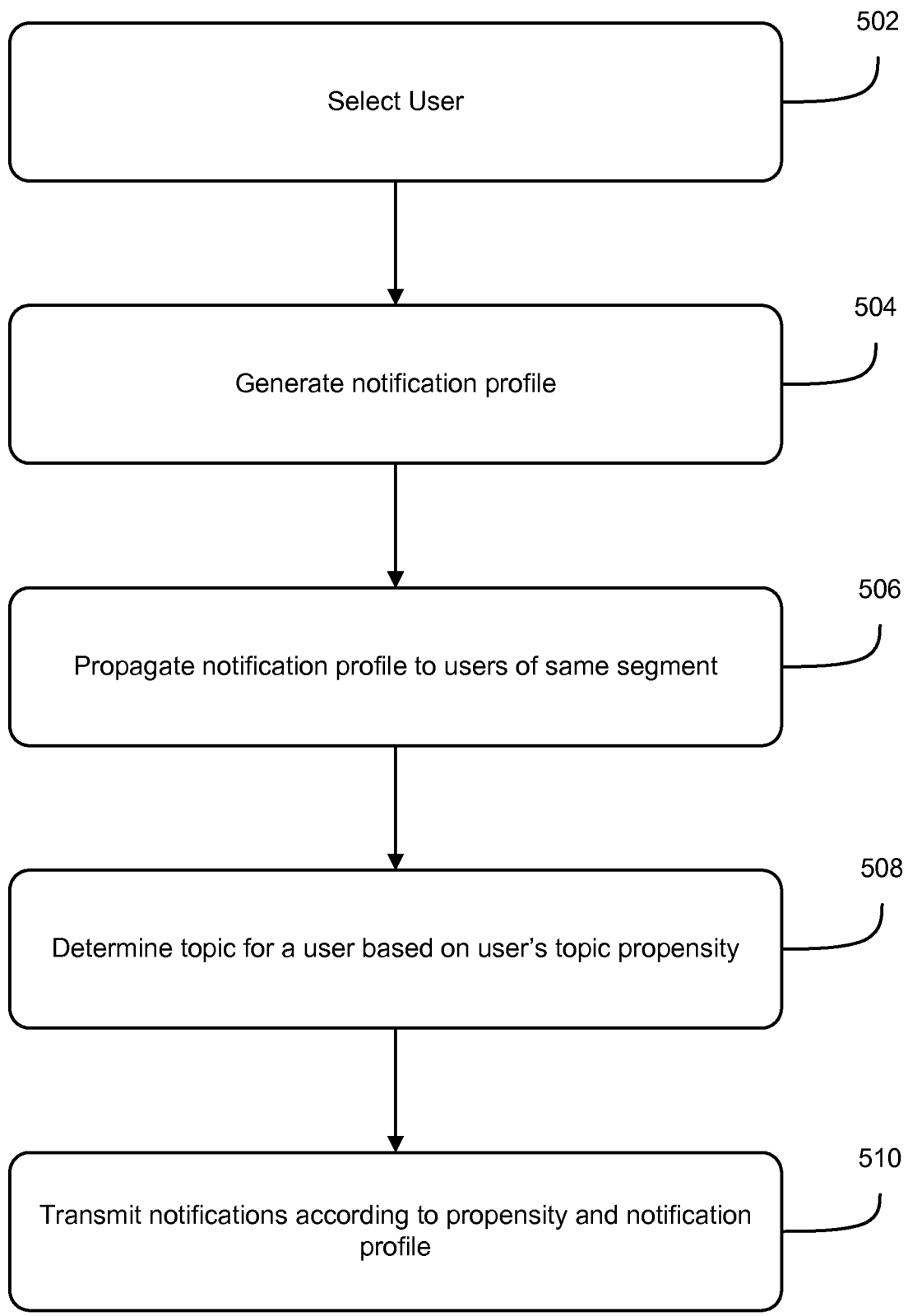
FIG. 5 illustrates an example flow for generating notifications and monitoring responses, according to a particular embodiment.
Figure 6:
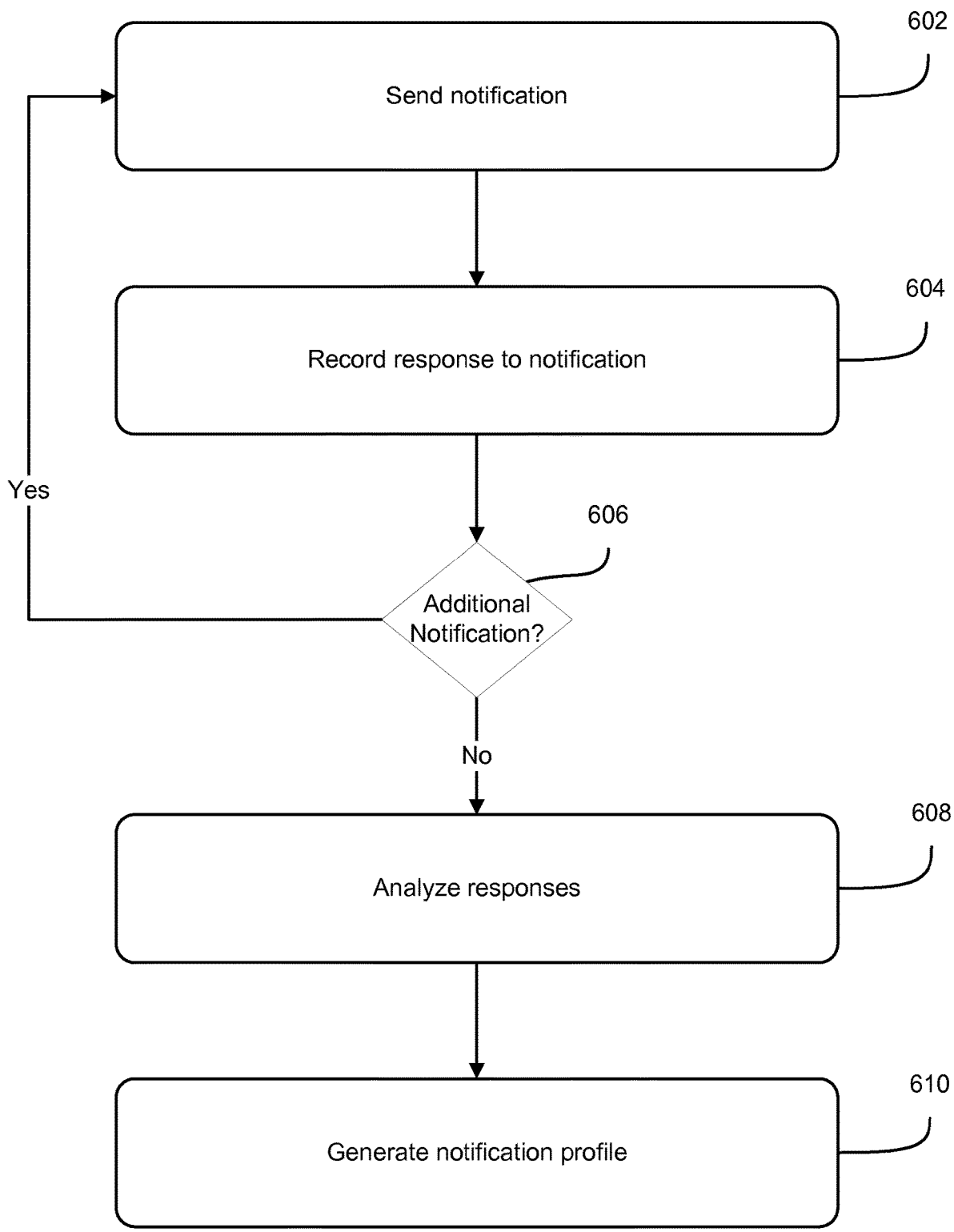
FIG. 6 illustrates an example flow for generating a notification profile, according to a particular embodiment.
Figure 7:
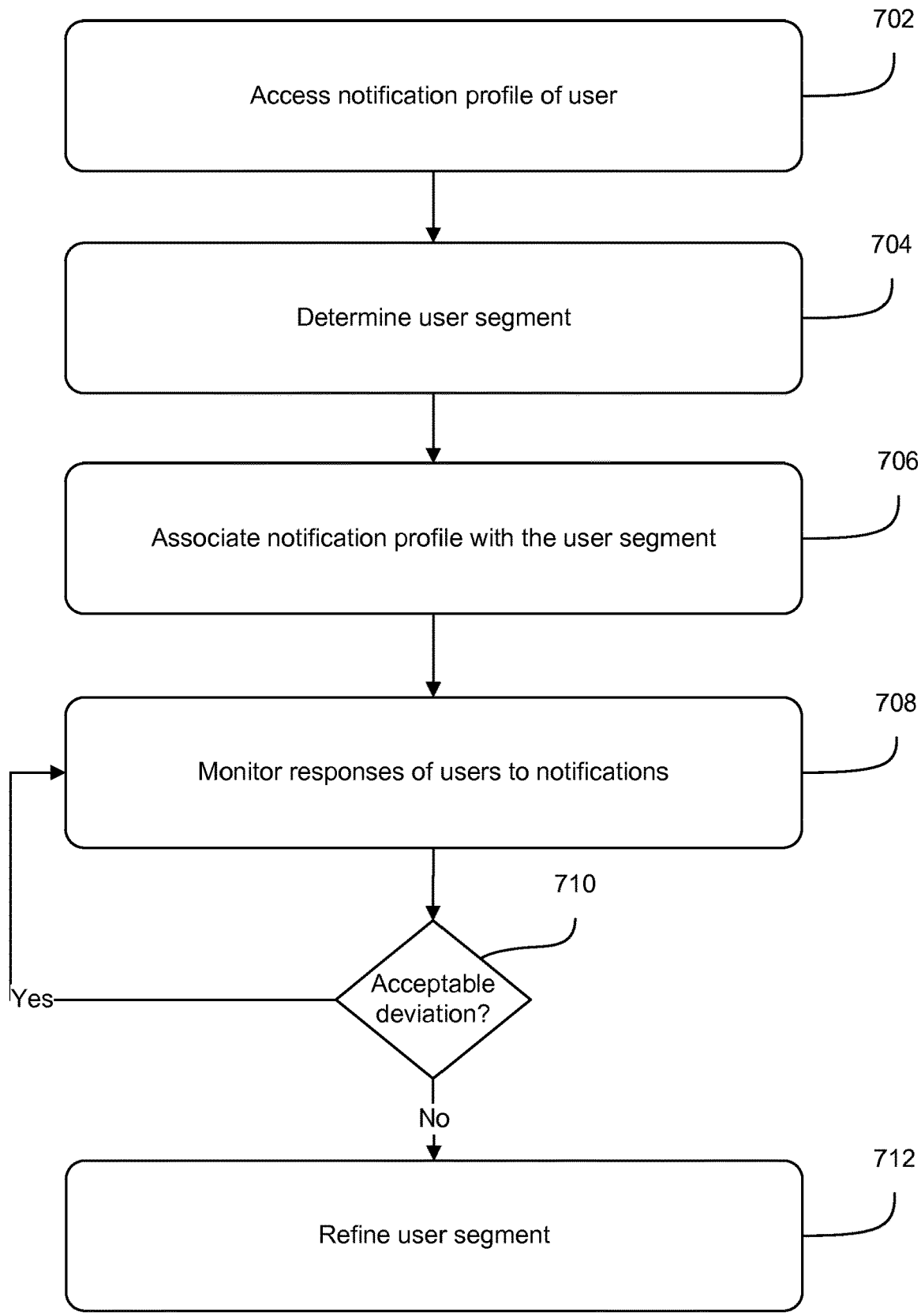
FIG. 7 illustrates an example flow for associating a notification profile with a user segment, according to a particular embodiment.
Figure 8:
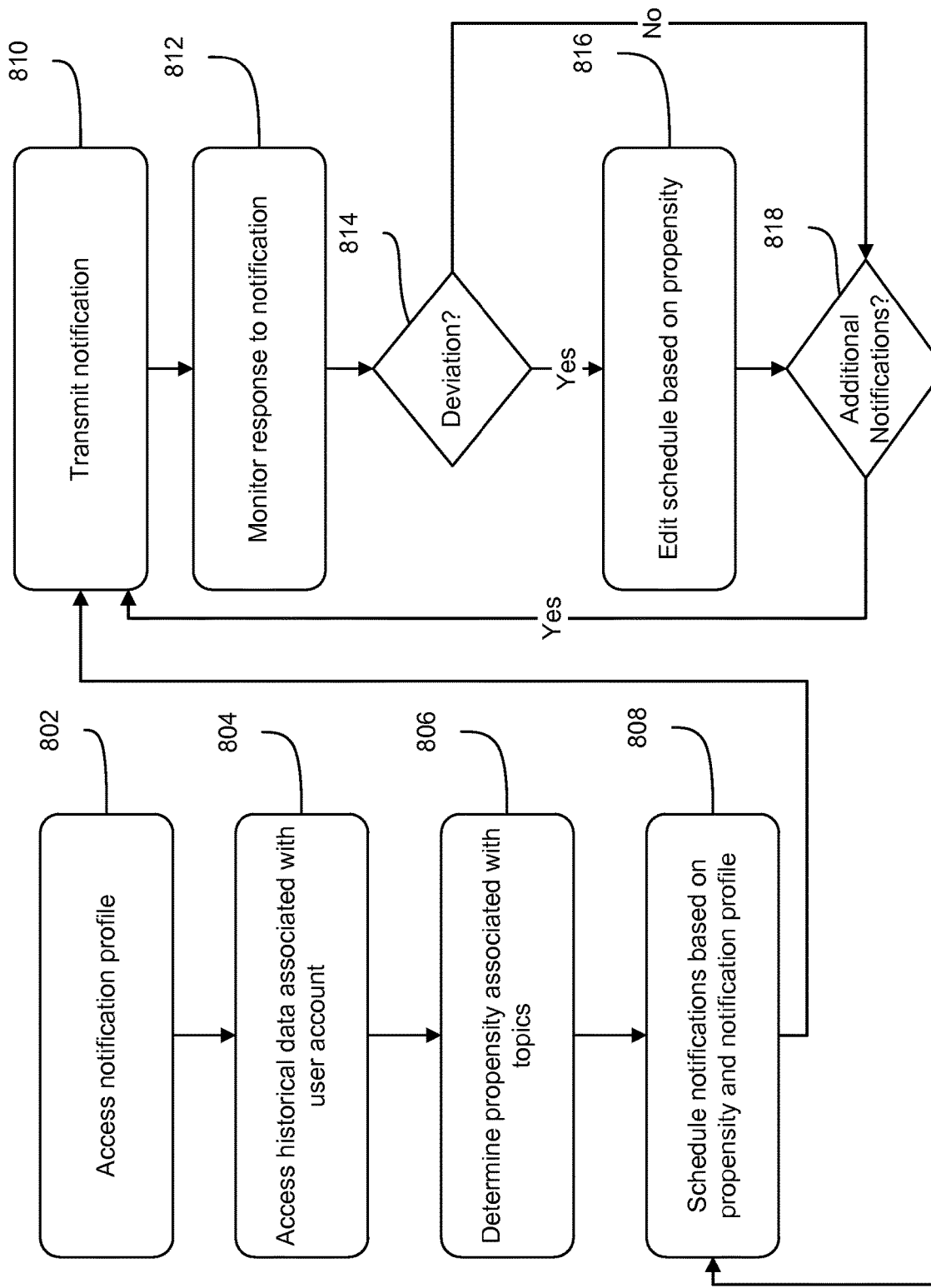
FIG. 8 illustrates an example flow for generating notifications based on a notification profile, according to a particular embodiment.

Turning to FIGS. 5-8, those figures illustrate example flows for managing notifications. FIG. 5 illustrates an example high level flow for generating and transmitting notifications. FIG. 6 illustrates an example flow for generating a notification profile. FIG. 7 illustrates an example flow for associating a notification profile with a plurality of users. FIG. 8 illustrates an example flow for determining a user's propensity for receiving a notification topic and monitoring the user's real-time response to customize content of notifications. Some of the operations of the example flows of FIGS. 5-8 may be similar. Such similarities are not repeated herein in the interest of clarity of explanation.

Further, in the illustrative operations, some of the operations or functions may be embodied in, and fully or partially automated by, modules executed by one or more processors. In the interest of clarity of explanation, a computer system and/or a user device may be described as performing certain operations. This performance may nonetheless include various components such as those of the notification manager 112 and/or an application 140. In addition, the operations may not be limited to only one computer system and one user device, but may also involve a larger number of computing resources. Other, or a combination of other, computer systems, and modules may be additionally or alternatively used. Also, while the operations are illustrated in a particular order, it should be understood that no particular order is necessary and that one or more operations may be omitted, skipped, and/or reordered.

Turning to FIG. 5, the example flow may start at operation 502, where a user may be selected. For example, a user account of the user at an electronic marketplace (or another resource hosted or facilitated by the computer system) may be selected. Because there may be a large number of users (e.g., in the thousands or even millions), selecting a subset of users to generate notification profiles may reduce the computational burden on the computer system. As such, the user account may be selected as part of a strategy to manage such a computational burden. For instance, the user may be selected randomly based on a sampling of the various users of the electronic marketplace. In another illustration, the user may be selected for belonging to a particular user segment. A user segment may include a plurality of user accounts that may share a common attribute associated with interacting with the electronic marketplace. For example, one user segment may include user accounts that may have subscribed to a particular service of the electronic marketplace, whereas another user segment may include the remaining user accounts.

At operation 504, a notification profile may be generated. The notification profile may be associated with the user account. For example, past notifications transmitted to and past responses to notifications received from one or more user devices of the user may be analyzed. The analysis may consider the number, types, and time frames of the notifications and/or responses, and the recipient user devices to generate the notification profile. FIG. 6 further illustrates an example flow for implementing this operation.

At operation 506, the notification profile may be propagated to other user accounts. The user account and the other user accounts may belong to a same user segment. As such, rather than generating a notification profile for each user account of the user segment, it may be sufficient to generate one notification profile and propagate such a notification profile to all of the user accounts of the user segment. This approach may reduce the usage of computational resources of the computer system. Propagating the notification profile may include associating the notification profile with the various user accounts. In an example, the association may involve storing the notification profile and adding an identifier or a link (e.g., a uniform resource locator) in a user account to the stored notification profile.

At operation 508, a notification topic for a user may be determined. The user may correspond to any of the user accounts associated with the notification profile (e.g., within the user segment). For instance, the user may be the same user selected under operation 502. In another illustration, the user may be a different user having a different user account that may belong to the user segment. Regardless, the notification profile may be used for all of the associated user accounts. Accordingly, for each or for a subset of these user accounts, notification topics may be determined.

The notification topic may be determined based on the corresponding user's propensity for receiving the notification topic. For example, attributes of the user and historical information related to interaction attributes with the electronic marketplace may be accessed and analyzed from the respective user account. The analysis may apply machine learning, pattern recognition, regression models, and/or other analysis techniques to such information to identify and rank notification topics of potential interest for the user. FIG. 8 further illustrates an example flow for implementing this operation.

At operation 510, notifications may be transmitted to one or more user devices associated with the user account based on the notification profile and the user's propensity for receiving the notification topic. For example, the quantity and timing of the notifications may be scheduled based on the sequence of time slots of the notification profile. The content of the notifications may be customized based on the respective notification topics of potential interests. In addition, response to transmitted notifications may be monitored in real-time to further refine or change the content (or notification topic) of the next scheduled notifications. FIG. 8 further illustrates an example flow for implementing this operation.

Generally, a notification profile may be generated based on analysis of data related to past notifications and responses thereto. For example, this data may include the number, type, and timings of the notifications and/or responses. In an example, a machine learning algorithm may be applied to the data to determine various behaviors of the data. In another example, a statistical analysis may be used instead to determine the behaviors. For instance, a cumulative distribution function may be generated from the number of transmitted notifications, dismissal responses, and the respective time frames. The cumulative distribution function may identify the behaviors. Regardless of the analysis techniques, the behaviors may indicate the tolerance of the user to notification, such as how the user may respond to a notification giving the timing of the notification and the number of already transmitted notifications within a time period. A desired behavior may be defined (e.g., a behavior where the user does not dismiss more than ten percent of the notifications). The notification profile may then be defined using the desired behavior by, for instance, setting the sequence of time slots according to the user's tolerated number.

In addition, the analysis techniques may be further refined by considering additional parameters. For example, the analysis may consider the number of user devices associated with the user account, an amount of usage time associated with usage of an application hosted on the user device and configured to interact with the computer system. To illustrate, the computer system may track what notifications may have been transmitted to what user device, the time frames of such transmissions, the types of responses received from each device for the same or different notifications, and the timings of these notifications. This data may be analyzed to identify the user's tolerance of the notification per user device. The notification profile may accordingly reflect this tolerance.

Turning to FIG. 6, the figure illustrates an example flow for generating a notification profile. The flow may apply to any of the above analysis techniques at different granularity levels (e.g., per user account, user device, etc.). The example flow may start at operation 602, where a notification may be sent to a user device associated with a user account. At operation 604, a response to the notification may be recorded. For example, the recorded data may include the type of the response (e.g., dismissal, view, etc.), the timing of the response, the identifier of the notification, the timing of notification, the user device, the user account, and/or any other data related to the notification and/or response.

At operation 606, a determination is made as to whether an additional notification should be transmitted to the user device. This determination may be based on a predefined sequence of notifications. In particular, the user account may have been selected as a candidate for generating the notification profile. To do so, various notifications may be scheduled for transmission to the user to identify different behavior responses. Such notifications may be scheduled for a specific user device or across multiple user devices associated with the user account. In one example approach, testing of the user behavior can be used. For instance, over a period of days, weeks, or even months, different predefined sequences may be used which, in a way, may reflect testing different potential notification profiles and resulting behaviors. For instance, ten notifications may be scheduled for transmission at even time intervals across one day, twenty notifications may be scheduled for random transmission on the next day, and so on and so forth. Over time, this type of testing may indicate what sequence may result in a desired behavior. In another example approach, testing may not be used. Instead, existing scheduling techniques may be used to transmit the notifications. For instance, an existing technique may define a sequence where a number of notifications may be sent based on a user event, such as when an item may have been added or removed from a virtual shopping cart, upon check out of the virtual shopping cart, when an item may have been shipped, etc. Regardless of the used approach, if an additional notification should be sent, operation 602 may follow operation 606 such that an additional response may be recorded. Otherwise, operation 608 may be used to analyze the recorded responses.

At operation 608, the recorded responses may be analyzed. For example, a machine learning algorithm or a statistical analysis may be applied to the recorded data to determine the tolerance of the user for notifications. This tolerance may be associated with the user account and may be determined per user device or per group of user devices. The tolerance may indicate the number of notifications and the respective time frames that may result in a desired behavior (e.g., the user dismissing less than ten percent of the notifications). At operation 610, the notification profile may be generated to reflect the number and time frames of the notifications. For example, the notification profile may include a sequence of time slots where each time slot may correspond to one of the time frames for transmitting one of the notifications and where the sequence may correspond to the order of the notifications.

Once a notification profile is generated for a user account (or a user) belonging to a user segment, that notification profile may be propagated to other user accounts of that user segment. Doing so may reduce computing resource usage of the computer system especially when the number of user accounts may be large (e.g., in the thousands of even millions). FIG. 7 illustrates an example flow for propagating the notification profile.

The example flow of FIG. 7 may start at operation 702, where a notification profile associated with a user account may be accessed. For example, the notification profile may have been generated and stored in a data store. Accordingly, the notification profile may be accessed from the data store. At operation 704, a user segment may be determined from, for example, the user account. Different user segments may exist. Example user segments may segment user accounts based on subscription types to a membership of the electronic marketplace. Other example user segments may segment user accounts based on how recent each account may have generated at the electronic marketplace, how frequent each user account may be used to access the electronic marketplace, and/or the monetary spending of each user account at the electronic marketplace. The user account may belong to one or more of these user segments.

At operation 706, the notification profile may be associated with the user segment. If more than one user segment may have been determined at operation 704, similar associations may be made to all of the determined user segments. Associating the notification profile may include, for example, linking the notification profile to the user segment and/or the user account(s) belonging to the user segment(s). For instance, an identifier of the notification profile (e.g., a uniform resource locator of the storage location of the notification profile) may be added to the user segment(s) and/or to the user accounts.

At operation 708, responses of users to notifications may be monitored over time. These users may correspond to the user accounts that may have been associated with the notification profile. On one hand, the notification profile may have been generated based on data of a single user. On the other hand, the various users belong to the same user segment. As such, the notification profile may be relevant to users, but deviating responses (or tolerances to notifications) may be expected among these users. As such, the monitoring may allow further refinement to the user segment and/or to the associations between the notification profile and the various user accounts. Monitoring the responses may include recording for each user account the respective response types to the respective notifications, the associated timings, user devices, etc.

At operation 710, a deviation among the responses of the users may be analyzed to determine whether the deviation may be acceptable or not. For example, the responses may be analyzed for each user account to determine an exhibited behavior (e.g., a rate of notification dismissals). The behaviors of the different users (e.g., the behaviors associated with the different user accounts) may be compared to determine variations between the users. These variations may be analyzed to determine a deviation from the expected behavior given the notification profile. For instance, the expected behavior may indicate that a user should have a notification dismissal rate less than ten percent. If the exhibited behaviors indicate that only sixty percent of the users meet that dismissal rate, then forty percent of the users may be deviating from the expected user behavior. As such, the notification profile may not be proper for that forty percent of users. Instead, this notification profile should be disassociated and another notification profile should be associated instead with the respective forty percent of the user accounts. A decision to disassociate and re-associate notification profiles may be based on whether the deviation may be acceptable or not. For example, the number of deviating users (or user accounts) may be compared to a predefined threshold (e.g., thirty percent) to make that decision. If the deviation is acceptable (e.g., the percentage of deviating user accounts less than thirty percent), operation 708 may follow operation 710 such that the monitoring of the responses may continue over time. Otherwise, operation 712 may be performed to address the unacceptable deviation.

At operation 712, the user segment may be refined to address the unacceptable deviation. In one example, the user segment may be further segmented or divided into additional user segments, where the responses (or exhibited behaviors) may be used as a segmenting factor. For instance, and referring back to the above sixty-forty percent example, the sixty percent of users may be segmented in a first user segment (or sub-segment) and the remaining forty percent in a second user segment. The notification profile may be associated with the first, but not the second user segment. A new notification profile may be generated and associated with the second user segment.

Notifications may be scheduled for transmission to a user device. Content of the notifications may be customized based on the user's propensity for receiving different notification topics. In addition, while notifications may be transmitted within a time period, the responses thereto may be monitored within that time period. This type of monitoring may represent a real-time tracking of the user's behavior and may be used to update (e.g., further customize) content of the remaining notifications to be transmitted within the remaining portion of the time period. FIG. 8 illustrates an example of this real-time monitoring and update.

The example flow of FIG. 8 may start at operation 802, where a notification profile may be accessed. For example, a user account for a user may be identified. In turn, the notification profile may be identified from the user account based on an association therewith.

At operation 804, historical data associated with the user account may be accessed. The historical data may relate to past notifications, such as content and/or topic of these past notifications and the resulting response types. The historical data may also relate to past interactions of the user with the electronic marketplace. For example, this historical data may include a subscription to a notification topic, searched items, purchased items, returned items, search keywords, browsing history, amount of usage time of an application for accessing the electronic marketplace, time of the last interaction with the electronic marketplace, and/or other interaction-related data.

At operation 806, the user's propensity for receiving notification topics may be determined. If the user has subscribed to a particular notification topic, that particular topic may be ranked as corresponding to the highest propensity such that when notifications about that particular topic may become available, these notifications may be transmitted to one or more user devices of the user according to the notification profile. In addition, various analysis techniques may be applied to the historical data to identify and rank topics of potential interest to the user, thereby generating a ranked list of notification topics corresponding to the user's propensity. The analysis techniques may include, for example, machine learning, pattern recognition, regression models.

At operation 808, notifications may be scheduled based on the user's propensity and the notification profile. On one hand, the notification profile may indicate a sequence of time slots to transmit notifications within a time period. On the other hand, the user's propensity may indicate a list of ranked notification topics of interest. As such, queues of notifications may be generated corresponding to the time slots and notification topics of interest. For example, a first queue may include notifications having content corresponding to the highest ranked notification topic, where the notifications may be organized using the sequence of time slots. A second queue may similarly be generated for the next ranked notification topic and so on and so forth.

At operation 810, a notification may be transmitted based on the schedule. For example, the first queue (corresponding to the highest ranked notification topic) may be used first. A notification belonging to that queue may be pushed based on the respective time. In an example, the notification may be pushed to one or more user devices, where these used devices may be identified from the user account and/or from the notification profile. In another example, the notification may be pushed to the active user device only (e.g., the last seen at or currently interacting with the electronic marketplace).

At operation 812, a response to the notification may be monitored. For example, a determination may be made as to whether the notification may have been delivered to the user device(s) and the resulting response type (e.g., viewed or dismissed). The monitoring may be performed over the time frame within the time period corresponding to the time slot of the notification. For instance, if the notification profile indicates that the notification may be relevant between 8:00 and 8:59 AM, and if the notification may have been sent at 8:10 AM, the monitoring may be performed until 8:59 AM (corresponding to the beginning of the next time slot) or until the time the next scheduled notification is transmitted.

At operation 814, the monitored response may be analyzed to determine whether a deviation may have occurred. A deviation may represent a change to an expected behavior. For example, once transmitted, it may be expected that the user views the notification since the timing and content of the notification may have set based on the user's tolerance for notifications and propensity for receiving notification topics. However, if the notification is dismissed, that response type (e.g., notification dismissal) may represent a deviation. If a deviation is detected, operation 816 may follow operation 814 to adjust the content of the next scheduled and/or remaining notifications within the time period. Otherwise, operation 818 may be performed to proceed with transmitting remaining notifications without a change.

At operation 816, the schedule may be edited based on the user's propensity for receiving notification topics. In an example, the deviation may indicate that the content of the last transmitted notification may not have been of interest to the user. As such, a determination may be made as to whether to change the content of the next notification to a different topic or not. Multiple factors may be used to make the determination. An example factor may include the ranking of the notification topic of the last notification relative to remaining notification topics. If the ranking is much higher, the notification topic may not be changed. If the ranking is close or similar, the notification topic may be changed to the next ranked notification topic. Another example factor may include the timing of the last response relative to the timing of the last notification. If the timing indicates that the last response was dismissed shortly after transmittal, that may indicate a lack of interest of the user in the last notification. Accordingly, the notification topic may be changed to the next ranked notification topic. Yet another example factor may include the content itself of the last notification. If the content was of one type (e.g., informational only), the content may change to another type (e.g., to offer a discount), without changing the notification topic.

If the notification topic should not change, the schedule may accordingly not change. Otherwise, the schedule may be edited. In an example, editing the schedule may include maintaining the current time slots (as set by the notification profile), but changing the content of the remaining, to be transmitted notifications. For instance, the next notification topic may be selected (e.g., as the one being the next ranked topic). The queue corresponding to that next notification topic may be accessed. Notifications of that queue may then be used as the remaining, to be transmitted notifications.

At operation 818, a determination may be made as to whether additional notifications should be transmitted. This determination may be made by comparing the number of already transmitted notifications to the total number of notifications indicated by the notification profile. For example, if three notifications have already been sent within a day, whereas the notification profile indicates a total of five within the day, two remaining notifications should be transmitted. As such, if additional notifications should be transmitted, operation 810 may follow operation 818 to transmit the next notification within the time period. Otherwise, operation 808 may follow operation 818 to schedule the next batch of notifications for the next time period.

Figure 9:
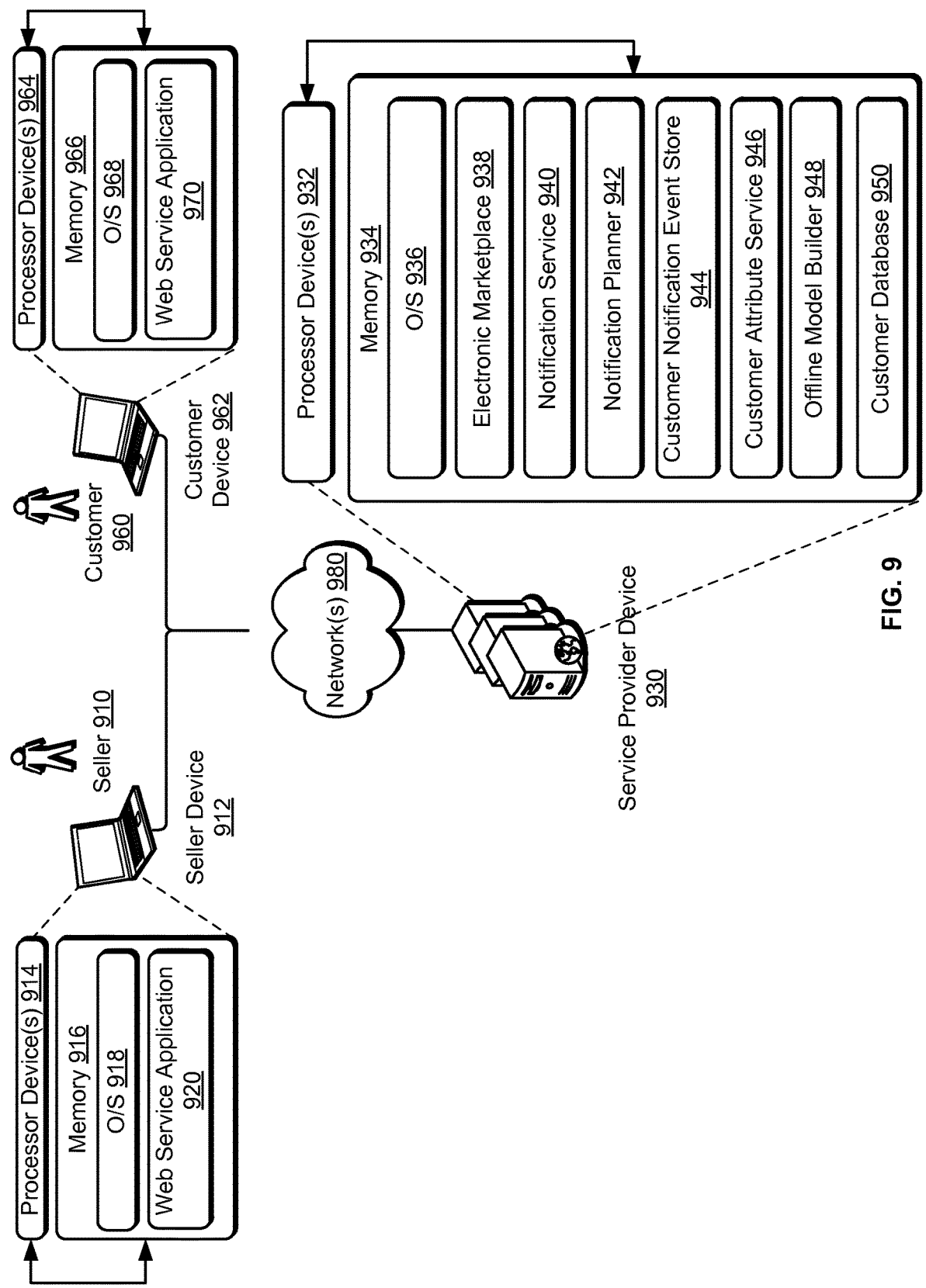
FIG. 9 illustrates example end-to-end architecture for facilitating an electronic marketplace, according to a particular embodiment.

Turning to FIG. 9, that figure illustrates an example end-to-end computing environment for managing notifications in connection with an electronic marketplace. In this example, a service provider may implement a notification manager to manage the notifications. The notifications may relate to items available from the electronic marketplace. The items may be listed for offering by a seller 910 and/or the service provider and may be available for ordering by a customer 960.

In a basic configuration, the seller 910 may utilize a seller device 912 to access local applications, a web service application 920, a seller account accessible through the web service application 920, a web site or any other network-based resources via one or more networks 980. In some aspects, the web service application 920, the web site, and/or the seller account may be hosted, managed, and/or otherwise provided by one or more computing resources of the service provider, such as by utilizing one or more service provider devices 930. The seller 910 may use the local applications and/or the web service application 920 to interact with the network-based resources of the service provider and perform seller-related transactions. These transactions may include, for example, offering items for sale.

In some examples, the seller device 912 may be any type of computing devices such as, but not limited to, a mobile phone, a smart phone, a personal digital assistant (PDA), a laptop computer, a thin-client device, a tablet PC, etc. In one illustrative configuration, the seller device 912 may contain communications connection(s) that allow the seller device 912 to communicate with a stored database, another computing device or server, seller terminals, and/or other devices on the networks 980. The seller device 912 may also include input/output (I/O) device(s) and/or ports, such as for enabling connection with a keyboard, a mouse, a pen, a voice input device, a touch input device, a display, speakers, a printer, etc.

The seller device 912 may also include at least one or more processing units (or processor device(s)) 914 and one memory 916. The processor device(s) 914 may be implemented as appropriate in hardware, computer-executable instructions, firmware, or combinations thereof. Computer-executable instructions or firmware implementations of the processor device(s) 914 may include computer-executable or machine-executable instructions written in any suitable programming language to perform the various functions described.

The memory 916 may store program instructions that are loadable and executable on the processor device(s) 914, as well as data generated during the execution of these programs. Depending on the configuration and type of seller device 912, the memory 916 may be volatile (such as random access memory (RAM)) and/or non-volatile (such as read-only memory (ROM), flash memory, etc.). The seller device 912 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 916 may include multiple different types of memory, such as static random access memory (SRAM), dynamic random access memory (DRAM), or ROM.

Turning to the contents of the memory 916 in more detail, the memory may include an operating system (O/S) 918 and the one or more application programs or services for implementing the features disclosed herein including the web service application 920. In some examples, the seller device 912 may be in communication with the service provider devices 930 via the networks 980, or via other network connections. The networks 980 may include any one or a combination of many different types of networks, such as cable networks, the Internet, wireless networks, cellular networks, and other private and/or public networks. While the illustrated example represents the seller 910 accessing the web service application 920 over the networks 980, the described techniques may equally apply in instances where the seller 910 interacts with the service provider devices 930 via the seller device 912 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 960 may utilize customer device 962 to access local applications, a web service application 970 (or some other mobile application such as a "mobile app" available from an application store), a customer account accessible through the web service application 970, a web site, or any other network-based resources via the networks 980. In some aspects, the web service application 970, the web site, and/or the user account may be hosted, managed, and/or otherwise provided by the service provider devices 930 and may be similar to the web service application 920, the web site accessed by the computing device 912, and/or the seller account, respectively.

The customer 960 may use the local applications and/or the web service application 970 to conduct transactions with the network-based resources of the service provider. These transactions may include, for example, browsing for items, viewing items, ordering items, reviewing items, returning items, receiving notifications, viewing notifications, dismissing notifications, and/or other transactions.

In some examples, the customer device 962 may be configured similarly to the seller device 912 and may include at least one or more processing units (or processor device(s)) 964 and one memory 966. The processor device(s) 964 may be implemented as appropriate in hardware, computer-executable instructions, firmware, or combinations thereof similarly to the processor device(s) 914. Likewise, the memory 966 may also be configured similarly to the memory 916 and may store program instructions that are loadable and executable on the processor device(s) 964, as well as data generated during the execution of these programs. For example, the memory 966 may include an operating system (O/S) 968 and the one or more application programs or services for implementing the features disclosed herein including the web service application 970.

As described briefly above, the web service applications 920 and 970 may allow the seller 910 and customer 960, respectively, to interact with the service provider devices 930 to conduct transactions involving items. The service provider devices 930, perhaps arranged in a cluster of servers or as a server farm, may host the web service applications 920 and 970. These servers may be configured to host a web site (or combination of web sites) viewable via the computing devices 912 and 962. Other server architectures may also be used to host the web service applications 920 and 970. The web service applications 920 and 970 may be capable of handling requests from many sellers 910 and customers 960, respectively, and serving, in response, various interfaces that may be rendered at the computing devices 912 and 962 such as, but not limited to, a web site. The web service applications 920 and 970 may interact with any type of web site that supports interaction, including social networking sites, electronic retailers, informational sites, blog sites, search engine sites, news and entertainment sites, and so forth. As discussed above, the described techniques may similarly be implemented outside of the web service applications 920 and 970, such as with other applications running on the computing devices 912 and 962, respectively.

The service provider devices 930 may, in some examples, provide network-based resources such as, but not limited to, applications for purchase and/or download, web sites, web hosting, client entities, data storage, data access, management, virtualization, etc. The service provider devices 930 may also be operable to provide web hosting, computer application development, and/or implementation platforms, or combinations of the foregoing to the seller 910 and customer 960.

The service provider devices 930 may be any type of computing device such as, but not limited to, a mobile phone, a smart phone, a personal digital assistant (PDA), a laptop computer, a desktop computer, a server computer, a thin-client device, a tablet PC, etc. The service provider devices 930 may also contain communications connection(s) that allow service provider devices 930 to communicate with a stored database, other computing devices or servers, seller terminals, and/or other devices on the network 980. The service provider devices 930 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 930 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 930 may be in communication with the computing devices 912 and 962 via the networks 980, or via other network connections. The service provider devices 930 may include one or more servers, perhaps arranged in a cluster, or as individual servers not associated with one another.

In one illustrative configuration, the service provider devices 930 may include at least one or more processing units (or processor devices(s)) 932 and one memory 934. The processor device(s) 932 may be implemented as appropriate in hardware, computer-executable instructions, firmware, or combinations thereof. Computer-executable instruction or firmware implementations of the processor device(s) 932 may include computer-executable or machine-executable instructions written in any suitable programming language to perform the various functions described.

The memory 934 may store program instructions that are loadable and executable on the processor device(s) 932, as well as data generated during the execution of these programs. Depending on the configuration and type of the service provider devices 930, the memory 934 may be volatile (such as random access memory (RAM)) and/or non-volatile (such as read-only memory (ROM), flash memory, etc.). The service provider devices 930 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 934 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 934 in more detail, the memory may include an operating system (O/S) 936, code for an electronic marketplace 938, code for a notification service 940, code for a notification planner 942, code for a customer notification event store 944, code for a customer attribute service 946, code for an offline model builder 948, a code for a customer database 950.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for reducing the processing burden to manage application notifications in real-time, the computer-implemented method comprising:

transmitting, by a computer system associated with an application, a notification to an instance of the application on a user device, the user device associated with a first user account at an electronic marketplace, the notification associated with an item available from the electronic marketplace, the notification comprising first metadata that includes a first identifier of the notification and a second identifier of the user device;

receiving, by the computer system, a response to the notification from the user device, the response comprising second metadata that includes the first identifier of the notification, the second identifier of the user device, and a first response type of the response, the first response type comprising at least one of a viewing of the notification at a user interface of the user device or a dismissal of the notification from the user interface, the first response type generated by at least one of the instance or an operating system of the user device based at least in part on a detection by the at least one of the instance or the operating system of a user interaction with the user interface;

receiving, by the computer system, additional responses to respective additional notifications associated with the first user account;

generating, by the computer system, a notification profile associated with the first user account based at least in part on the second metadata from the response and additional metadata from the additional responses, the notification profile indicating a total number of notifications to transmit in a time period and time slots within the time period to transmit respective notifications of the total number of notifications;

identifying, by the computer system, a user segment that comprises the first user account and a second user account, the first user account and the second user account sharing a common attribute that relates to an interaction with the electronic marketplace;

associating, by the computer system, the notification profile with the second user account;

determining, by the computer system, a first notification topic and a second notification topic for the first user account based at least in part on past first interactions with the electronic marketplace, the past first interactions associated with the first user account;

determining, by the computer system, a third notification topic for the second user account based at least in part on past second interactions with the electronic marketplace, the past second interactions associated with the second user account;

generating a first queue of first notifications corresponding to the first notification topic, a second queue of second notifications corresponding to the second notification topic, and a third queue of third notifications corresponding to the third notification topic;

scheduling, by the computer system, the first notifications corresponding to the first notification topic and the third notifications corresponding to the third notification topic for transmission to one or more instances of the application within the time period based at least in part on the notification profile, the first queue, and the third queue;

transmitting, by the computer system, a first notification of the first notifications to the instance of the application on the user device based at least in part on the scheduling;

receiving, by the computer system within the time period, a first response to the first notification of the first notifications, the first response comprising a second response type, the second response type generated by the at least one of the instance or the operating system;

selecting, by the computer system and in real-time, the second notification topic based at least in part on the second response type indicating a dismissal of the first notification from the user interface and on timing of the first response relative to a transmission of the first notification; and updating, by the computer system, content of remaining notifications to be transmitted within a remaining portion of the time period based at least in part on the second notifications from the second queue.

2. The computer-implemented method of claim 1, wherein the notification is transmitted as a push notification by the computer system, wherein the push notification causes the user device to activate an alert at the user device, and wherein the instance of the application causes the user device to transmit the response to the computer system.

3. The computer-implemented method of claim 1, wherein the additional notifications are transmitted to a second user device associated with the first user account, wherein the additional responses are received from the second user device, and wherein scheduling the first notifications comprises:
  selecting between the user device and the second user device for transmission of a particular notification of the first notifications such that a quantity of total notifications that are scheduled for transmission within the time period and that are associated with the first user account does not exceed the total number of notifications indicated in the notification profile.

4. The computer-implemented method of claim 1, further comprising:
  receiving second responses associated with the second user account to the third notifications;
  determining a deviation between the second responses and expected responses that are based at least in part on the notification profile; and
  updating the user segment based at least in part on the deviation.

5. One or more non-transitory computer readable storage media comprising instructions that, when executed with one or more processors, cause a computer system to perform operations comprising:
  transmitting a notification to an instance of an application on a user device, the user device associated with a first user account, the notification comprising first metadata that includes a first identifier of the notification and a second identifier of the user device;
  receiving a response to the notification from the user device, the response comprising second metadata that includes the first identifier of the notification, the second identifier of the user device, and a first response type of the response, the first response type comprising at least one of a viewing of the notification at a user interface of the user device or a dismissal of the notification from the user interface, the first response type generated by at least one of the instance or an operating system of the user device based at least in part on a detection by the at least one of the instance or the operating system of a user interaction with the user interface;
  accessing a plurality of responses to a plurality of respective notifications transmitted from the computer system to one or more user devices associated with the first user account;

generating a notification profile for the first user account based at least in part on metadata of the plurality of responses, the metadata comprising the second metadata, the notification profile comprising a sequence of time slots to transmit notifications within a time period;

identifying a user segment that comprises the first user account and a second user account, the first user account and the second user account sharing a common attribute;

associating, by the computer system, the notification profile with the second user account;

determining a first notification topic and a second notification topic based at least in part on first interactions with the computer system from the one or more user devices;

determining a third notification topic for the second user account based at least in part on past second interactions associated with the second user account;

generating a first queue of first notifications corresponding to the first notification topic, second queue of second notifications corresponding to the second notification topic, and a third queue of third notifications corresponding to the third notification topic;

scheduling the first notifications corresponding to the first notification topic and the third notifications corresponding to the third notification topic for transmission to one or more instances of the application within the time period based at least in part on the notification profile, the first queue, and the third queue;

transmitting a first notification of the first notifications to the instance of the application on the user device based at least in part on the scheduling;

receiving, within the time period, a first response to the first notification, the first response comprising a second response type, the second response type generated by the at least one of the instance or the operating system;

selecting, in real-time based at least in part on the second response type indicating a dismissal of the first notification and on timing of the first response relative to a transmission of the first notification, the second notification topic as a next notification topic for a second notification to transmit within the time period; and updating content of remaining notifications to be transmitted within a remaining portion of the time period based at least in part on the second notifications from the second queue.

6. The one or more non-transitory computer readable storage media of claim 5, wherein the first user account is associated with an electronic marketplace, wherein the notification profile is associated with information about a plurality of items available from the electronic marketplace, and wherein the first notification topic relates to an item of the plurality of items.

7. The one or more non-transitory computer readable storage media of claim 5, wherein the third notifications are scheduled for transmission within the time period to a second user device associated with the second user account.

8. The one or more non-transitory computer readable storage media of claim 5, wherein the first notification topic and the second notification topic are ranked based at least in part on an analysis of past interactions, and wherein the operations further comprise:

scheduling the first notification for transmission within a first time slot of the sequence of time slots and the second notification for transmission within a second time slot of the sequence of time slots based at least in part on the notification profile, wherein the first notification comprises information about the first notification topic based at least in part on the first notification topic and the second notification topic being ranked.

9. The one or more non-transitory computer readable storage media of claim 5, wherein generating the notification profile comprises:

determining a quantity of the plurality of respective notifications, transmission time frames of the plurality of respective notifications, and types of the plurality of responses; and generating the sequence of time slots based at least in part on the quantity, the transmission time frames, and the types of the plurality of responses.

10. The one or more non-transitory computer readable storage media of claim 5, wherein the plurality of responses comprises notification dismissals, wherein the plurality of respective notifications comprises dismissed notifications corresponding to the notification dismissals, and wherein generating the notification profile comprises:

determining a quantity of the notification dismissals;

setting a total number of time slots based at least in part on the quantity;

determining time frames corresponding to respective transmissions of the dismissed notifications; and setting durations corresponding to the time slots based at least in part on the time frames.

11. The one or more non-transitory computer readable storage media of claim 5, wherein a first time slot of the sequence of time slots has a first duration, wherein a second time slot of the sequence of time slots has a second duration that is different from the first duration, and wherein the first duration and the second duration are based at least in part on types of the plurality of responses and transmission time frames of the plurality of respective notifications.

12. The one or more non-transitory computer readable storage media of claim 5, wherein transmitting the first notification comprises:

detecting that a first user device of the one or more user devices is active during a first time slot;

transmitting the first notification to the first user device, and wherein transmitting the second notification comprises:

detecting that the first user device is inactive during a second time slot and that a second user device of the one or more user devices is active during the second time slot; and transmitting the second notification to the second user device and not the first user device.

13. A computer system comprising:

one or more processors; and one or more non-transitory computer readable storage media comprising instructions that, when executed with the one or more processors, cause the computer system to at least:

transmit a notification to an instance of an application on a user device, the user device associated with a user account, the notification comprising first metadata that includes a first identifier of the notification and a second identifier of the user device;

receive a response to the notification from the user device, the response comprising second metadata that includes the first identifier of the notification, the second identifier of the user device, and a first response type of the response, the first response type comprising at least one of a viewing of the notification at a user interface of the user device or a dismissal of the notification from the user interface, the first response type generated by at least one of the instance or an operating system of the user device based at least in part on a detection by the at least one of the instance or the operating system of a user interaction with the user interface;

access a plurality of responses to a plurality of respective notifications transmitted from the computer system to the user device;

generate a notification profile for the user account based at least in part on metadata of the plurality of responses, the metadata comprising the second metadata, the notification profile comprising a sequence of time slots to transmit notifications within a time period;

associate the notification profile with a plurality of user accounts, the plurality of user accounts sharing a common attribute with the user account, the common attribute relating to interactions with the computer system;

determine a first notification topic and a second notification topic for a second user account of the plurality of user accounts, the first notification topic determined based at least in part on past interactions with the computer system, the past interactions associated with the second user account;

generate a first queue of first notifications corresponding to the first notification topic and a second queue of second notifications corresponding to the second notification topic;

select a notification topic from the first notification topic and the second notification topic based at least in part on the past interactions;

generate a schedule of notifications from the first queue or the second queue and corresponding to the notification topic for transmission to one or more user devices associated with the second user account based at least in part on the notification profile;

transmit the notifications to one or more devices;

select, in real-time based at least in part on one or more responses to the notifications from the one or more devices, between the first notification topic and the second notification topic as a next notification topic, the one or more responses generated by at least one of the instance or the operating system and indicating one or more notification dismissals and timing of the one or more responses; and update the schedule of the notifications to transmit next notifications corresponding to the next notification topic.

14. The computer system of claim 13, wherein the instructions, when executed with the one or more processors, further cause the computer system to at least:

transmit a first notification of the notifications to a second user device associated with the second user account, wherein the first notification comprises first content related to the notification topic and is transmitted within a first time slot of the sequence of time slots;

receive a response to the first notification from the second user device;

select second content for a second notification of the notifications based at least in part on the response; and transmit the second notification comprising the second content to the second user device, wherein the second notification is transmitted within a second time slot of the sequence of time slots.

15. The computer system of claim 14, wherein the second content relates to the notification topic if the response indicates that the first content was accessed from the computer system based at least in part on the first notification, wherein the second content relates to the next notification topic if the response indicates that the first notification was dismissed.

16. The computer system of claim 13, wherein associating the notification profile with the plurality of user accounts comprises adding an identifier of the notification profile to the second user account.

17. The computer system of claim 13, wherein the first user account and the second user account belong to a user segment, wherein the instructions, when executed with the one or more processors, further cause the computer system to at least:

monitor first responses to the notifications, the first responses received from the one or more user devices associated with the second user account;

schedule second notifications for transmission to a first user device associated with the first user account;

monitor second responses to the second notifications, the second responses received from the first user device;

determine a deviation between the first responses and the second responses;

remove the first user account or the second user account from the user segment based at least in part on the deviation.

18. The computer system of claim 13, wherein the notification profile indicates a total number of transmittable notifications within the time period, and wherein the instructions further cause the computer system to at least: transmit the notifications to the one or more user devices such that a quantity of the notifications does not exceed the total number of transmittable notifications.

19. The computer system of claim 13, wherein the instructions, further cause the computer system to at least: determine that the second user account comprises a subscription to a particular notification topic, and wherein generating the schedule comprises reserving one or more time slots of the notification profile to particular notifications related to the particular notification topic.

20. The computer system of claim 13, wherein the notification profile is generated based at least in part on one or more of: a number of user devices associated with the user account, an amount of usage time associated with usage of an application hosted on the user device and configured to interact with the computer system, a number of notification dismissals, a total number of transmitted notifications, or time intervals between the transmitted notifications, and wherein the notification topic is determined based at least in part on one or more of: a type of the second user account, a user segment that includes the second user account, a subscription associated with the user account to a particular notification topic, content of the transmitted notifications, or historical information provided from the computer system to the user devices.

* * * * *

UNITED STATES PATENT AND TRADEMARK OFFICE
CERTIFICATE OF CORRECTION

PATENT NO. : 10,621,622 B1
APPLICATION NO. : 14/866754
DATED : April 14, 2020
INVENTOR(S) : Tegdeep Kondal, Nisarg Shah and Alexander Slutsker Page 1 of 1

It is certified that error appears in the above-identified patent and that said Letters Patent is hereby corrected as shown below:

In the Claims

Column 23, Line 20, Claim 5:
Delete: "ing to the first notification topic, second queue of"
Insert --ing to the first notification topic, a second queue of--

Column 26, Line 16, Claim 17:
Delete: "17. The computer system of claim 13, wherein the first"
Insert --17. The computer system of claim 13, wherein the--

Column 26, Line 30, Claim 17:
Delete: "remove the first user account or the second user account"
Insert --remove the user account or the second user account--

Signed and Sealed this
Fifteenth Day of September, 2020

Andrei Iancu
*Director of the United States Patent and Trademark Office*